United States Patent
Dudar

(10) Patent No.: US 9,889,740 B1
(45) Date of Patent: Feb. 13, 2018

(54) SYSTEM AND METHOD TO CONTROL ENGINE MOUNT TEMPERATURE

(71) Applicant: Ford Global Technologies, LLC, Dearborn, MI (US)

(72) Inventor: Aed M Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/606,528

(22) Filed: May 26, 2017

(51) Int. Cl.
*B60L 1/02* (2006.01)
*F02D 41/06* (2006.01)
*B60L 11/18* (2006.01)
*B60R 25/20* (2013.01)

(52) U.S. Cl.
CPC ............. *B60L 1/02* (2013.01); *B60L 11/1816* (2013.01); *F02D 41/062* (2013.01); *B60L 2230/12* (2013.01); *B60R 25/209* (2013.01); *Y10S 903/904* (2013.01)

(58) Field of Classification Search
CPC .... B60L 1/02; B60L 11/1816; B60L 2230/12; F02D 41/062; B60R 25/209; Y10S 903/904
USPC .......................................................... 180/300
See application file for complete search history.

(56) References Cited

U.S. PATENT DOCUMENTS

| | | | |
|---|---|---|---|
| 4,671,227 A | 6/1987 | Hollerweger | |
| 4,720,087 A | 1/1988 | Duclos | |
| 4,869,476 A * | 9/1989 | Shtarkman | F16F 13/30 188/267.1 |
| 5,386,977 A | 2/1995 | Quast | |
| 8,100,388 B2 | 1/2012 | Lee | |
| 8,672,105 B2 * | 3/2014 | Kim | F16F 13/305 188/267.2 |
| 2012/0132492 A1 | 5/2012 | Kim | |
| 2017/0138434 A1* | 5/2017 | Gaither | F16F 13/002 |

FOREIGN PATENT DOCUMENTS

KR 1020100131256 A 12/2010

* cited by examiner

*Primary Examiner* — John D Walters
(74) *Attorney, Agent, or Firm* — Gregory P. Brown; Diana D. Brehob; Brehob Law, PLLC

(57) ABSTRACT

Cold engine mounts are known to be stiffer than desirable causing vibration from the engine to be more easily transmitted to the engine frame and cabin occupants. A system and method whereby the engine mounts are preheated before engine start is disclosed. In a prior art disclosure, the onboard battery pack is used to preheat. As cold start is the most demanding battery condition, it may be unwise to draw battery current. PHEVs are commonly coupled to an external electrical power supply for overnight charging. If such external power source is available, an indication of imminent engine start can allow engine mount preheat. Such preheat not only prevents much of the engine's vibration to be transmitted to the engine compartment, it also allows operation of fuel economy saving modes such as variable displacement when some of the engine's cylinders are turned off, a condition which exacerbates engine vibration.

20 Claims, 2 Drawing Sheets

SYSTEM AND METHOD TO CONTROL ENGINE MOUNT TEMPERATURE

FIELD

The present disclosure relates to controlling the temperature of engine mounts in an automotive vehicle.

BACKGROUND

Most engine mounts are passive rubber components. The desire is to have stiff engine mounts during high speed/high torque operation to minimize the relative movement between the engine and the vehicle frame to minimize stress on exhaust joints. During low speed engine operation, a softer engine mount is desired to avoid transmitting engine vibrations to the vehicle frame and to vehicle occupants. If vibration is transmitted to the vehicle frame, it may become a source of customer dissatisfaction. Unfortunately, during cold start, the rubber engine mount is cold and at its stiffest. And, during cold start, this is typically a time when the engine is operating at low speed when a softer engine mount is desired. When the engine compartment warms up, the engine mount also warms up and becomes softer, which is when a stiffer mount is desired.

Another passive engine mount is a hydraulic mount in which damping is provided by a hydraulic fluid that passes through an orifice. Hydraulic mounts suffer from the same problem as rubber mounts due to the hydraulic fluid in the engine mount being colder and thus more viscous at low temperatures, i.e., stiffer damping. When warm the hydraulic fluid is less viscous and provides less damping.

Some engines are equipped with cylinder deactivation so that at low torque demand, the valves are deactivated in some number of cylinders so that the cylinders continuing to operate are at a higher torque, higher efficiency operating condition to thereby reduce fuel consumption. In cylinder deactivation mode, the firing frequency of the engine is reduced and is possibly uneven, leading to vibration transmission to the vehicle frame. In vehicles equipped with cylinder deactivation, it is common to delay cylinder deactivation until the engine mounts are sufficiently warmed up after a cold start to avoid undesirable transmission of vibration to vehicle occupants. Unfortunately, right after cold start is often a time when cylinder deactivation would provide a desirable boost in operational efficiency.

Some engine mounts are tunable or active. The hydraulic mount can have a valve to control the ease with which the hydraulic fluid moves between chambers and thus the damping. Other examples include electrorheological and magnetorheological fluids in engine mounts. When a stiffer mount is desired, an electric current or magnetic field, respectively, is applied to cause the fluid to become more viscous and stiffen. Such active engine mounts are soft at idle when the fluid is at operating temperature. However, during cold start operation, the un-warmed fluid can be more viscous than desired transmitting too much vibration to the vehicle occupants and not allowing cylinder deactivation.

In prior art KR20120069918, a resistance heater is disposed in the engine mount. The heater is coupled to and powered by the engine's battery to preheat the engine mount prior to engine starting. Such a system relies on the engine battery for preheat, thereby discharging the battery and impairing the battery's ability to crank the engine during the cold start, the greatest demand on the battery. A way to preheat the engine mount without draining the vehicle battery is desired.

SUMMARY

To overcome at least one problem in the prior art, a vehicle is disclosed that includes a frame, an internal combustion engine mounted to the frame via an engine mount, a heating element disposed in the mount, an external power source coupled to the vehicle by one of direct and indirect coupling, and an electronic control unit (ECU) electronically coupled to the heating element. The ECU activates the heating element in response to an indication that the engine is likely to be started within a predetermined time.

The vehicle is a plug-in hybrid electric vehicle and the external power source comprises a cable electrically coupling a battery disposed in the vehicle and an electrical energy grid external to the vehicle.

The mount has a resistance heater disposed therein and the resistance heater is the heating element.

In another embodiment, the mount is magnetorheological and the heating element is an electromagnet disposed in the mount.

In yet another embodiment, the mount is electrorheological and the heating element is an electric field applied across the amount.

In some embodiments, the indication of likely start is based on learning data that the ECU has collected on past vehicle use patterns.

Alternatively, the indication of likely start is based on one of: a trip start time preprogrammed by a vehicle operator, a signal initiated by a vehicle operator, movement of the vehicle operator, location of the vehicle operator; and movement and location of the vehicle operator are based on one of: a location of movement and location of a key fob of the vehicle and a location of movement and location of a cell phone associated with the vehicle operator.

In other embodiments, the activation of the heating element via the ECU is further based on a present temperature of the mount.

An engine mount system is disclosed that includes: an engine mount having a heating element, a battery electrically coupled to the heating element, an external power source coupled to the battery, an electronic control unit (ECU) coupled to the heating element and to the battery wherein the ECU commands the battery to supply electrical energy to the heating element in response to an indication that the engine is soon to be started.

The external power source comprises a cable electrically coupling a battery disposed in the vehicle and one of: an electrical energy grid and an external generator.

In some embodiments, the heating element is pulsed on and off.

A method for preheating an engine mount in a vehicle coupled to an external power source includes actuating a heating element disposed in the engine mount in response to an indication that an engine disposed in the vehicle is expected to be started within a predetermined time. The engine mount is located between a frame member of the vehicle and the engine.

The actuating can also be based on a temperature of the engine mount.

The heating element is coupled to a battery disposed in the vehicle; and the battery is couple to the external power source.

BRIEF DESCRIPTION OF THE DRAWINGS

FIG. 3 is an illustration of an engine mount having a resistance heater.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
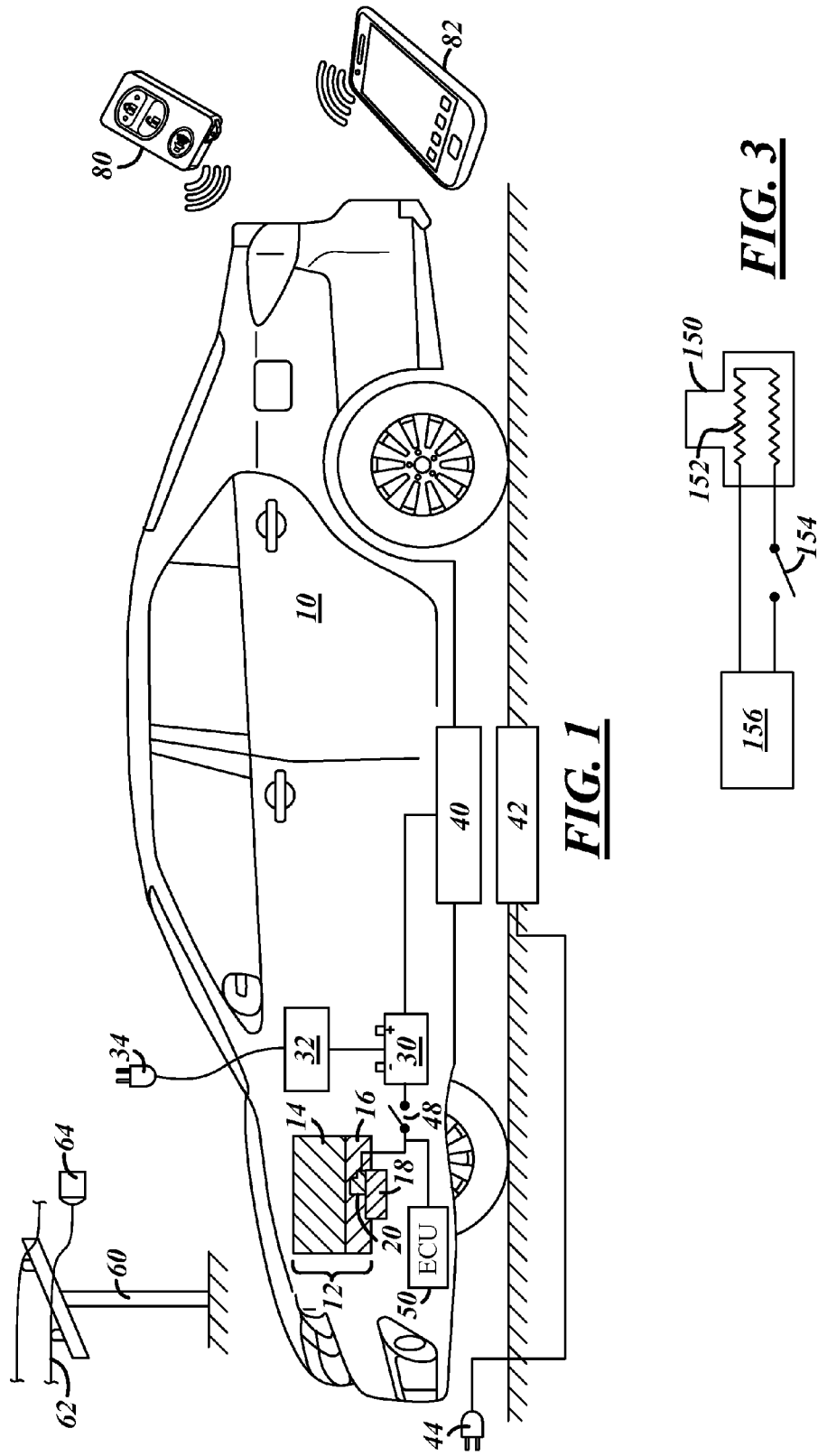
FIG. 1 is an illustration of a PHEV vehicle that has a heater in the engine mounts and is being charged.

An illustration of a Plug-in Hybrid Electric Vehicle (PHEV) 10 is shown in FIG. 1. Vehicle 10 is provided an internal combustion engine 12 that has a block 14, and an oil pan 16. An engine mount 20 is provided between a portion of a vehicle frame 18 and engine 12.

Vehicle 10 has a battery pack 30 that can be charged by engine 12 during operation of engine 12. When parked, battery pack 30 can be charged via an external grid. In one embodiment, an inductive charge unit 40 coupled to battery pack 30 of vehicle 10 is proximate an inductive charger 42. Inductive charger 42 have a plug 44 that is plugged into an external grid or external power supply. The convenience is that plug 44 can remain plugged in regardless of the vehicle's position. Element 44 is shown as a plug. Alternatively, inductive charger 42 has a hard wire to the grid.

In vehicles provided an inductive charge unit 40, an additional charging scenario may be supplied to allow charging at locations without an inductive charger 42. A rectifier/transformer 32 is coupled to battery back 30. Rectifier/transformer 32 is coupled to a plug 34 that can connect to an external grid. Of course, for vehicles without inductive charge capability, the only external charging is through elements 32 and 34.

One example of an external grid is shown with a pole 60 that has electrical lines 62. Lines 62 are provided electrical energy from a power plant, solar, wind, etc. provided by a utility company or locally generated. A receptacle 64 is provided that connects to plugs 34 or 44. Such illustration is an exceedingly simplistic representation of the external electrical supply.

Also shown in FIG. 1 is an electronic control unit (ECU) 50 that is electronically coupled to vehicle 10, engine 12, and battery pack 30 at least. A switch 48 that is controlled by ECU 50 is provided between battery pack 30 and engine mount 20. It is desirable to preheat engine mount 20. However, it would be wasteful to provide electrical energy to engine mount 20 whenever battery pack 30 is being charged. Instead, the desire is to preheat engine mount 20 just before engine 12 is going to be started. In reality, an indication that engine 12 is soon to be started is an estimate at best. Thus, the preheating may occur sooner or later than ideal. Some slight wastage of electrical energy is accepted with preheating starting too soon. Or, in the case of preheating starting too late, it is helpful to have preheating even if not as much as desired. ECU 50 could be a low power device that accepts signals from sensors and user input and outputs control signals. In other embodiments, ECU 50 also includes the power electronics. ECU 50 in FIG. 1 is used to represent all facets used in electrical control of vehicle 10.

A key fob 80 is also shown in FIG. 1. Fob 80 can be used by a vehicle operator to indicate to vehicle 10 that use of vehicle 10 is imminent. A button on fob 80 could be depressed. Fob 80 communicates wirelessly with ECU 50. In other embodiments, the location of fob 80 may indicate that starting vehicle 10 is imminent. As an example, a vehicle operator with fob 80 in a pocket might approach vehicle 10 when accessing a coat or brief case when making last preparations before leaving their house. By learning this behavior, ECU 50 could interpret the position of fob 80 as an indication of imminent vehicle usage. Additionally, many vehicle operators have predictable usage patterns, e.g., leave on weekdays within a narrow range of time. ECU 50 can learn such patterns and command preheating of engine mounts 20. The present disclosure does not address determining imminent usage. Instead, it exploits that information to use it to preheat engine mounts.

In an alternative embodiment, a cell phone 82 is used to detect an indication of starting. The proximity or pattern of movement of a vehicle operator's cell phone 82 is analyzed to detect an imminent need to use the vehicle. It is possible that particular words in emails or texts or the operator's calendar might be interrogated to determine that the vehicle operator is about to start the car.

An electronic-hydraulic engine mount system has two fluid chambers connected by a small orifice that is always open and a larger orifice that it kept closed by a controllable valve. When the larger orifice is closed and/or the fluid is viscous, the mount is stiff providing very little damping. When the larger orifice is opened and the fluid is sufficiently warmed up to be less viscous, the mount damps as desired for low torque, low speed operation.

Some active engine mounts use a magnetorheological fluid. The fluid includes a random dispersion of magnetizable particles. When no magnetic field is applied, the fluid exhibits Newtonian-like rheological behavior. When a field is applied, the particles align into fibrous structures and behaves as a Bingham plastic. By controlling the field applied, the stiffness of the engine mount is controlled. Such an engine mount is described in more detail in patent publication U.S. 2012/0132492.

Another alternative is to use an electrorheological fluid in the engine mount. Such fluid has electrically active particles suspended in a non-conductive fluid. When no electric field is applied, the liquid behaves as a Newtonian fluid and changes to as a Bingham plastic with an electric field applied. An engine mount using an electrorheological fluid is described more fully in U.S. Pat. No. 4,720,087.

In some situations, the engine may have been recently used and the engine compartment is still warm. In this case, it may be useful to use a lower power level or ramp the power u to bring the mount up to the desired temperature. In embodiments with purely elastomeric mounts it may be helpful to ramp the power up gradually to the engine mounts to ensure that the material of the mounts is not compromised by overheating.

Figure 2:
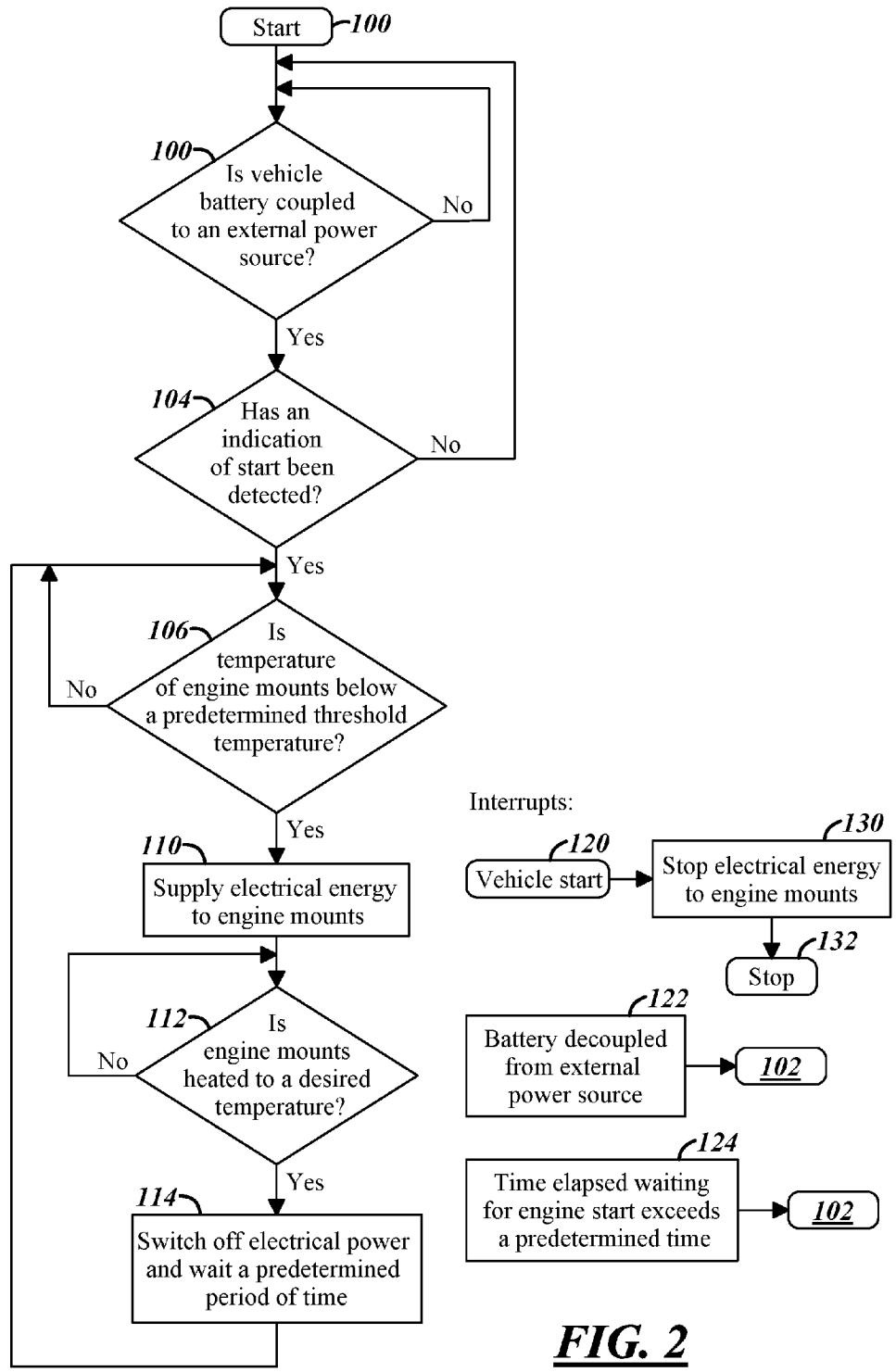
FIG. 2 is a flowchart showing a set of operations by which engine mounts in a PHEV can be prewarmed prior to operation of the engine.

Referring to FIG. 2, a flowchart illustrating embodiments by which the external power is used to preheat engine mounts is shown. After starting in 100, it is determined whether the vehicle battery is coupled to an external power source in block 102. It is desirable, as described above, to discharge the battery for preheating engine mounts. Thus, if there is no external power source, i.e., a negative result from block 102, control continues to look through block 102. When a positive result from block 102, control passes to block 104 in which it is determined whether there has been an indication of imminent starting of the vehicle. Such indication is in advance of starting the vehicle to provide time for preheating the engine mount. A non-limiting set examples of indications of imminent starting are discussed above. If a negative result from block 104, control passes to block 102. If a positive result, control passes to block 106 in which it is determined whether the temperature in the engine mount is below a predetermined threshold temperature. If vehicle 10 were recently driven, it is possible that engine mount preheating is unnecessary. Additionally, there may be other reasons, such as high ambient temperature, that obviate preheating. If a negative result in block 106, control loops through block 106. If a positive result in block 106, control passes to block 110 in which electrical energy is supplied to engine mounts. Control then passes to block 112 in which it is determine whether the engine mount has been heated to a desired temperature. If not, control continues to loop through block 112 until the temperature has achieved the desired temperature (yes result), in which control passes to block 114 in which the electrical power is shut off. After that, the algorithm is commanded to pause a predetermined time. Alternatively, the time is based on ambient conditions or other factors. After the pause, control passes to block 106 to determine if the engine mount temperature is too low. If so, control passes to block 110 for more heating.

In addition to the synchronous control in FIG. 2, there are several interrupts to the procedure. If the vehicle is started in block 120, the draw from the battery pack for preheating the engine mounts is suspended in block 130. In that case, control ends at block 132. Another interrupt occurs when the battery pack becomes decoupled from an external source of energy, e.g., the power cable is unplugged or is inadvertently interrupted by a power outage or the plug falling out, block 122. If such a situation occurs, control from block 122 passes to 102. Finally, if an indication that an engine start is imminent, yet doesn't occur, it is desirable to stop the heating of the engine blocks after a certain period of time, may be as long as hours. In block 124, if an indication of an upcoming start is received, yet after some predetermined time the engine doesn't start, control passes to block 102. If a positive result in block 102, control passes to block 104 to wait for a new indication of engine start.

Several types of engine mounts have been described. In one example, shown in FIG. 3, an engine mount 150 has a resistance heater 152 that is coupled to a battery 156 with the circuit being opened/closed by a switch 154. This resistance heater could be added to a purely rubber engine mount or a hydraulic engine mount. In regards to the engine mounts that use an electrorheological or a magnetorheological fluid, an electrical or magnetic field, respectively, is applied to affect the fluid's viscosity. By pulsing the field on and off, inefficiencies in the system cause the fluid to be heated.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, recyclability, environmental factors, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A vehicle, comprising:
a frame;
an internal combustion engine mounted to the frame via an engine mount;
a heating element disposed in the mount;
an external power source coupled to the vehicle by one of direct and indirect coupling; and
an electronic control unit (ECU) electronically coupled to the heating element wherein the ECU activates the heating element in response to an indication that the engine is likely to be started within a predetermined time.

2. The vehicle of claim 1 wherein the vehicle is a plug-in hybrid electric vehicle and the external power source comprises a cable electrically coupling a battery disposed in the vehicle and an electrical energy grid external to the vehicle.

3. The vehicle of claim 1 wherein:
the mount has a resistance heater disposed therein; and
the resistance heater is the heating element.

4. The vehicle of claim 1 wherein the indication of likely start is based on learning data that the ECU has collected on past vehicle use patterns.

5. The vehicle of claim 1 wherein the indication of likely start is based on one of: a trip start time preprogrammed by a vehicle operator, a signal initiated by a vehicle operator, movement of the vehicle operator, location of the vehicle operator; and movement and location of the vehicle operator are based on one of: a location of movement and location of a key fob of the vehicle and a location of movement and location of a cell phone associated with the vehicle operator.

6. The vehicle of claim 1 wherein the activation of the heating element via the ECU is further based on a present temperature of the mount.

7. An engine mount system for a vehicle, comprising:
an engine mount having a heating element;
a battery electrically coupled to the heating element;
an external power source coupled to the battery; and
an electronic control unit (ECU) coupled to the heating element and to the battery wherein the ECU commands the battery to supply electrical energy to the heating element in response to an indication that the engine is soon to be started.

8. The engine mount system of claim 7 wherein the vehicle is a plug-in hybrid electric vehicle and the external power source comprises a cable electrically coupling a battery disposed in the vehicle and one of: an electrical energy grid and an external generator.

9. The engine mount system of claim 7 wherein:
the mount has a resistance heater disposed therein; and
the resistance heater is the heating element.

10. The engine mount system of claim 9 wherein the heating element is pulsed on and off.

11. The engine mount system of claim 7 wherein the indication of likely start is based on one of: a signal initiated by a vehicle operator, movement of the vehicle operator, location of the vehicle operator; and movement and location of the vehicle operator are based on one of: a location of movement and location of a key fob of the vehicle and a location of movement and location of a cell phone associated with the vehicle operator.

12. The vehicle of claim 7 wherein the activation of the heating element via the ECU is further based on a present temperature of the mount.

13. A method for preheating an engine mount in a vehicle coupled to an external power source, the method comprising:
  actuating a heating element disposed in the engine mount in response to an indication that an engine disposed in the vehicle is expected to be started within a predetermined time wherein the engine mount is located between a frame member of the vehicle and the engine.

14. The method of claim 13, further comprising: basing the actuating also on a temperature of the engine mount.

15. The method of claim 13 wherein the heating element is coupled to a battery disposed in the vehicle; and the battery is couple to the external power source.

16. The method of claim 13 wherein the expectation of engine starting is based on vehicle usage patterns of the vehicle.

17. The method of claim 13 wherein the expectation of engine starting is based on one of: a signal initiated by a vehicle operator, movement of the vehicle operator, location of the vehicle operator; and movement and location of the vehicle operator are based on one of: a location of movement and location of a key fob of the vehicle and a location of movement and location of a cell phone associated with the vehicle operator.

18. The method of claim 13 wherein the vehicle is a plug-in hybrid electric vehicle and the external power source comprises a cable electrically coupling a battery disposed in the vehicle and one of: an electrical energy grid and an external generator.

19. The method of claim 13, further comprising: deactivating the heating element in the engine mount when the vehicle has been started.

20. The method of claim 13 wherein the engine mount is one of: elastomeric and hydraulic.

* * * * *